(12) United States Patent
Inoue

(10) Patent No.: US 8,466,645 B2
(45) Date of Patent: Jun. 18, 2013

(54) MOTOR CONTROL CIRCUIT

(75) Inventor: Tomohiro Inoue, Tokyo (JP)

(73) Assignee: Minebea Motor Manufacturing Corporation, Tokyo (JP)

(*) Notice: Subject to any disclaimer, the term of this patent is extended or adjusted under 35 U.S.C. 154(b) by 57 days.

(21) Appl. No.: 13/304,903

(22) Filed: Nov. 28, 2011

(65) Prior Publication Data
US 2012/0133316 A1    May 31, 2012

(30) Foreign Application Priority Data

Nov. 29, 2010   (JP) ................................. 2010-264860

(51) Int. Cl.
*H03K 5/00*   (2006.01)
*H02P 23/12*   (2006.01)
*H02P 1/30*   (2006.01)
*G05B 1/06*   (2006.01)
*G05B 11/28*   (2006.01)

(52) U.S. Cl.
USPC ................. 318/400.13; 318/400.14; 318/503; 318/638; 318/599

(58) Field of Classification Search
USPC ............... 318/400.13, 400.14, 503, 638, 599, 318/439
See application file for complete search history.

(56) References Cited

U.S. PATENT DOCUMENTS

| | | |
|---|---|---|
| 4,360,767 A | 11/1982 | Akiyama et al. |
| 2008/0252238 A1* | 10/2008 | Otaguro ............. 318/400.05 |

FOREIGN PATENT DOCUMENTS

| | | |
|---|---|---|
| JP | 63-010668 B | 3/1988 |
| JP | 5-236780 A | 9/1993 |
| JP | 7-067375 A | 3/1995 |
| JP | 2008-259321 A | 10/2008 |
| JP | 2008259321 A * | 10/2008 |

* cited by examiner

*Primary Examiner* — Bentsu Ro
*Assistant Examiner* — Bickey Dhakal
(74) *Attorney, Agent, or Firm* — Carrier Blackman & Associates, P.C.; Joseph P. Carrier; William D. Blackman

(57) ABSTRACT

A motor control circuit for a motor is provided. The motor control circuit drives the motor based on torque command data. The torque command data is output by adding speed error data output from a speed error detecting section based on a first reference clock and a speed pulse and phase error data output from a phase error detecting section based on a second reference clock and the speed pulse. Each of the speed error data and the phase error data is output within a detection range set by a setting section provided for each of the speed error detecting section and the phase error detecting section.

15 Claims, 11 Drawing Sheets

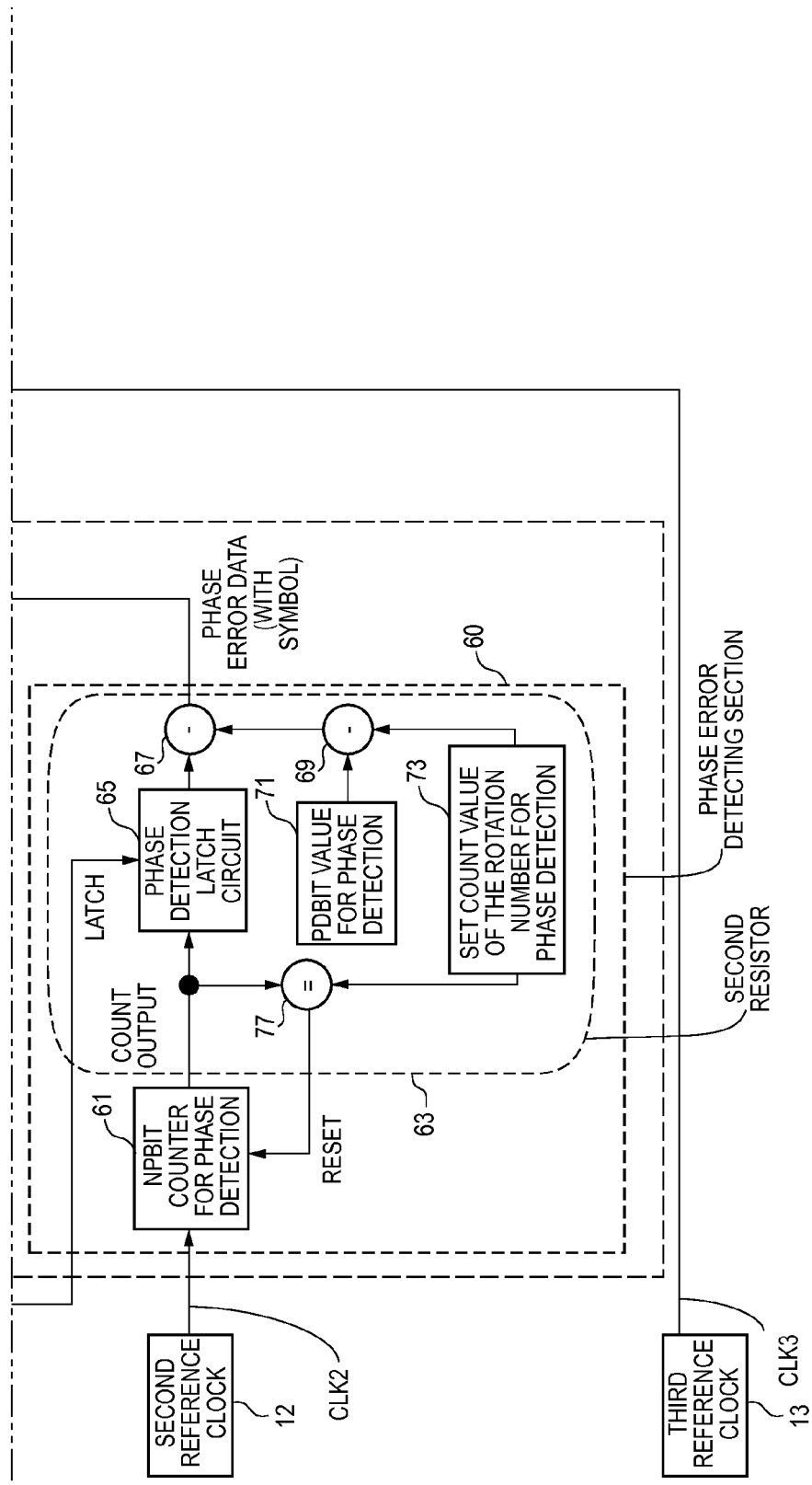

MOTOR CONTROL CIRCUIT

BACKGROUND OF THE INVENTION

1. Field of the Invention

The present invention relates to a motor control circuit, in particular, to a motor control circuit which carries out setting a speed control gain and a phase control gain in controlling rotation driving of a motor.

2. Description of the Related Art

As to a motor control circuit for controlling a rotation speed of a motor to be constant, for example, there has been a motor control circuit which detects a deviation of pulses and controls driving power of a motor based on the deviation. The motor control circuit has a reference pulse generating circuit, a deviation detecting circuit, and a pulse width modulating circuit.

For example, a speed pulse having a frequency, which corresponds to a rotation speed of a motor, and is generated by a pulse encoder provided in the motor, is input into the motor control circuit. The reference pulse generating circuit generates a reference pulse of a frequency corresponding to a reference rotation speed of the motor. The deviation detecting circuit detects a deviation between the speed pulse and the reference pulse. The pulse width modulating circuit (PWM circuit) generates a driving pulse having a pulse width corresponding to the deviation of the pulses. The driving power to the motor is output or stopped in accordance with an output of the pulse width modulating circuit.

JP-A-2008-259321 describes a motor control circuit which adjusts a PWM driving gain of a motor by changing each of a frequency of a reference clock of a speed deviation PWM driving signal and a frequency of a reference clock of a phase deviation PWM driving signal, thereby changing a duty of the speed deviation PWM driving signal or the phase deviation PWM driving signal.

JP-A-Hei.5-236780 describes a motor control circuit including a pulse width modulating circuit. The motor control circuit controls a rotation speed of a motor, by generating a pulse width modulated driving signal of a pulse width corresponding to a deviation between a speed pulse and a reference pulse. The motor control circuit may be implemented by a digital circuit.

JP-B-Sho.63-10668 describes a motor speed control device which improves stability in the rotation number by using a stable frequency such as an output of a crystal oscillator as a speed reference and improves stability in load by inserting a low frequency compensation circuit into a speed control loop.

JP-A-Hei.7-67375 relates to a motor control circuit and describes problems in multiplication and division processing by software, and carrying out the multiplication and division processing by means of hardware.

However, in the motor control circuit of JP-A-Hei.5-236780 or JP-A-Sho.63-10668, the rotation number N of the motor is represented by the formula below, in which G is a gain, and it is assumed that B (the number of speed pulses) speed pulses are output per rotation of the motor. As shown from the formula, if the gain G is adjusted to carry out control of rotation of the motor, the number N of rotations of the motor also varies.

The rotation number $N = 60*f/(G*B)$

In the motor control circuit of JP-A-2008-259321, in order to control the speed of the motor, a reference clock is altered (adjusted) simultaneously with gain adjustment. In the motor control circuit of JP-A-2008-259321, a PWM driving gain can be adjusted by changing a reference clock of a speed deviation PWM signal and a reference clock of a phase deviation PWM signal, thereby changing a PWM duty. Next, the operation of this kind of motor control circuit will be described with reference to FIG. 9.

FIG. 9 is a graph showing a relation between a speed deviation and a duty of a PWM driving signal in a related-art motor control circuit.

In FIG. 9, the horizontal axis indicates a speed deviation, and the vertical axis indicates a duty of a PWM driving signal (speed deviation PWM driving signal). As to the horizontal axis in FIG. 9, the rightward direction, toward which the speed deviation increases, corresponds to the direction, toward which the rotation speed of the motor slows down. The intersection point of the horizontal axis and the vertical axis indicates the state where the speed deviation is zero, namely, the state where the rotation speed is same as the set rotation number. At the intersection point of the horizontal axis and the vertical axis, the duty is 50%. The inclination of the straight lines on the X-Y coordinates presents gains of PWM driving. As the inclination of the straight lines increases, variation of the duty of the PWM driving signal responsive to variation of the speed deviation increases. In other words, as the inclination of the straight lines increases, gains increase.

The pulse width modulating circuit counts the reference clock, for the speed deviation, by a counter. In accordance with a speed determination signal, the pulse width modulating circuit also carries out addition or subtraction of a PWM reference signal, with respect to a time period during the count. Accordingly, a speed deviation PWM driving signal having a variable duty is generated. Here, if a frequency of the reference clock is reduced, the period of time during the count, which is added to the PWM reference signal, becomes long. Thus, the duty of the speed deviation PWM driving signal increases. In other words, if the frequency of the reference clock is reduced, the relation between the speed deviation and the duty of the PWM driving signal becomes close to the relation indicated by A6, from the relation indicated by A5, in FIG. 9. If the frequency of the reference clock is reduced, as long as the speed deviation prior to and after the reduction of the frequency is the same, the duty of the speed deviation PWM driving signal increases. In contrast, if the frequency of the reference clock increases, the period of time during the count is reduced, so that the duty of the PWM driving decreases. In other words, if the frequency of the reference clock increases, the relation between the speed deviation and the duty of the speed deviation PWM driving signal becomes close to the relation indicated by A7, from the relation indicated by A5, in FIG. 9. If the frequency of the reference clock increases, as long as the speed deviation prior to and after the increase of the frequency is the same, the duty of the speed deviation PWM driving signal is reduced. In other words, the reference clock is adjusted, such that the PWM driving signal is adjusted. Meanwhile, it is also possible to separately set a gain of the PWM duty by the phase deviation.

As described above, in the related-art motor control circuit, it is possible to separately set a gain of the PWM duty by the speed deviation and a gain of the PWM duty by the phase deviation. Also, it is possible to carry out gain setting by the frequency of the reference clock.

However, in the method disclosed in JP-A-2008-259321, the pulse width modulating circuit counts the reference clock by means of a counter having the fixed number of counts, with respect to the speed deviation. As such, a range of control of the motor by the PWM duty would be narrowed. In other words, if the frequency of the reference clock increases, an upper limit of the PWM driving signal is low, so that a broad control range, in which the PWM duty reaches up to 100%, cannot be obtained. For example, as to the relation between the speed deviation and the duty of the speed deviation PWM driving signal, the state indicated by A5 and the state indicated by A7, in which the frequency of the reference clock is higher than the state indicated by A5, in FIG. 9 are compared. In the relation indicated by A5, an upper limit of the duty is approximately 100%. However, in the relation indicated by A7, an upper limit of the duty is Ya (%) lower than 100%. Accordingly, as the frequency of the reference clock increases, the range of the duty ratio is narrowed. As a result, the range of control of the motor is narrowed.

Here, there is proposed a method for controlling a gain in accordance with error data and a control gain multiplier, by using a digital multiplying device. In other words, there is proposed a method for carrying out gain adjustment without influencing the PWM duty ratio, by using a digital multiplying device. For example, JP-A-Hei.7-67375 describes problems in multiplication and division processing by software, and carrying out the multiplication and division processing by means of hardware.

FIG. 10 is a view for explanation of gain control using a relate-dart digital multiplying device.

In FIG. 10, speed error data 810 (deviation data) and a control gain constant 820 are input into a multiplying device 815. The multiplying device 815 carries out processing based on the input data, and outputs control command data 817 for control of a gain. Similarly, for the phase, a multiplying device 825 outputs control command data 827 based on phase error data 830 (deviation data) and a control gain constant 840 that have been input. Based on the output control command data 817 and 827, adjusting a driving gain is carried out without influencing the reference clock for PWM duty count.

However, the digital multiplying device has complicated circuits and a large number of gates. In addition, the digital multiplying device has disadvantages because it has a relatively slow calculation processing speed. In other words, if the digital multiplying device is used, there would remain problem in miniaturization of the device using the motor control circuit, or precision of rotation driving control. JP-A-Hei.7-67375 does not count such problem in configuration or size of the hardware for multiplication and division.

SUMMARY OF THE INVENTION

The present invention has been made in view of the above circumstances, and it is an aspect of the present invention to provide a motor control circuit which is configured by a simple digital circuit and capable of adjusting a gain in a broad control range.

According to an illustrative embodiment of the present invention, there is provided a motor control circuit comprising: a speed detecting section configured to detect a speed pulse having a frequency corresponding to a rotation speed of a motor; a generating section configured to generate torque command data based on the speed pulse detected by the speed detecting section; a motor driving control section configured to generate a PWM command signal based on the torque command data generated by the generating section to control driving of the motor; a first output section configured to output a first reference clock; and a second output section configured to output a second reference clock. The generating section includes: a speed error detecting section configured to detect speed error data; a phase error detecting section configured to detect phase error data; and an addition section configured to add the speed error data and the phase error data to output torque command data. The speed error detecting section includes: a first counter configured to count the first reference clock output from the first output section; a first latch circuit configured to latch a count value of the first counter with the speed pulse; and a first setting section configured to set a speed error detection range. The speed error detecting section is configured to detect the speed error data based on the count value latched by the first latch circuit and set content by the first setting section. The phase error detecting section includes: a second counter configured to count the second reference clock output from the second output section; a second latch circuit configured to latch a count value of the second counter with the speed pulse; and a second setting section configured to set a phase error detection range. The phase error detecting section is configured to detect the phase error data based on the count value latched by the second latch circuit and set content by the second setting section.

In the above motor control circuit, the speed error detecting section may be configured to count the first reference clock in a first predetermined range, detect the speed error data by comparing the count value latched at a rise or decay timing of the speed pulse and a first reference count value obtained by subtracting a first predetermined value from a pre-set count value for speed detection, and output the speed error data within the speed error detection range set by the first setting section with respect to a value obtained by subtracting the first predetermined value from the count value for speed detection, and the speed error detecting section may be further configured to reset counting of and start recounting of the first reference clock at a rise or decay timing of the speed pulse.

In the above motor control circuit, the speed error detecting section may be configured to stop counting of the first reference clock when the speed pulse is not input until a count value of the first reference clock reaches the first reference count value.

In the motor control circuit, a count value of the first counter may be two or more times higher than the first predetermined value.

In the above motor control circuit, the phase error detecting section may be configured to count the second reference clock in a second predetermined range, detect the phase error data by comparing the count value latched at a rise or decay timing of the speed pulse and a pre-set count value for phase detection, and output the phase error data with a symbol within the phase error detection range set by the second setting section with respect to a value obtained by subtracting a second predetermined value from the count value for phase detection, and the phase error detecting section may be further configured to reset counting of and start recounting of the second reference clock when a count value of the second reference clock reaches a second reference count value for phase detection.

In the above motor control circuit, the phase error detecting section may be configured to stop counting of the second reference clock when a cycle of the speed pulse is longer or shorter than a cycle corresponding to the count value for phase detection.

In the above motor control circuit, a count value of the second counter may be two or more times higher than the second predetermined value.

In the above motor control circuit, the phase error detecting section may be configured to stop counting of the second reference clock at a first case where the speed pulse is not input within a first period of time, wherein the first period of time is a period of time during which counting of the second reference clock is reset two times, each occurring as the count value of the second reference clock reaching the second reference count value, after the counting of the second reference clock starts.

In the above motor control circuit, at the first case, the phase error detecting section may stop the counting of the second reference clock and makes the torque command data to be output from the addition section into a maximum value.

In the above motor control circuit, the phase error detecting section may stop counting of the second reference clock in a second case where, during a period of time until the speed pulse is input two times, the counting of the second reference clock is not reset even one time as the count value of the second reference clock reaching the second reference count value.

In the above motor control circuit, at the second case, the phase error detecting section may stop counting of the second reference clock and makes the torque command data to be output from the addition section into a minimum value.

In the above motor control circuit, the first output section may be configured such that a frequency of the first reference clock is adjustable, and by adjusting the frequency of the first reference clock, a gain and a range of speed system control using the speed error detecting section may be set.

In the above motor control circuit, the second output section may be configured such that a frequency of the second reference clock is adjustable, and by adjusting the frequency of the second reference clock, a gain and a range of phase system control using the phase error detecting section may be set.

In the above motor control circuit, the motor driving section may be configured to control driving of the motor in accordance with a third reference clock for a PWM control, which is independent from the first reference clock and the second reference clock.

In the above motor control circuit, the motor driving section may include: a PWM signal generating circuit configured to generate the PWM command signal based on the torque command data output from the addition section; and a motor driving circuit configured to drive the motor according to the PWM command signal generated by the PWM signal generating circuit.

According to the above configuration, a speed error detecting section and a phase error detecting section detect speed error data and phase error data, respectively, based on a latch circuit and set contents of a setting section. In accordance with torque command data output by addition of the detected data, control by a motor driving control section is carried out. Accordingly, it is possible to provide a motor control circuit, which is configured by a simple digital circuit and capable of adjusting a gain in a broad control range.

DETAILED DESCRIPTION

Hereinafter, a motor control circuit according to embodiments of the present invention will be described.

[Embodiment 1]

Figure 1A:
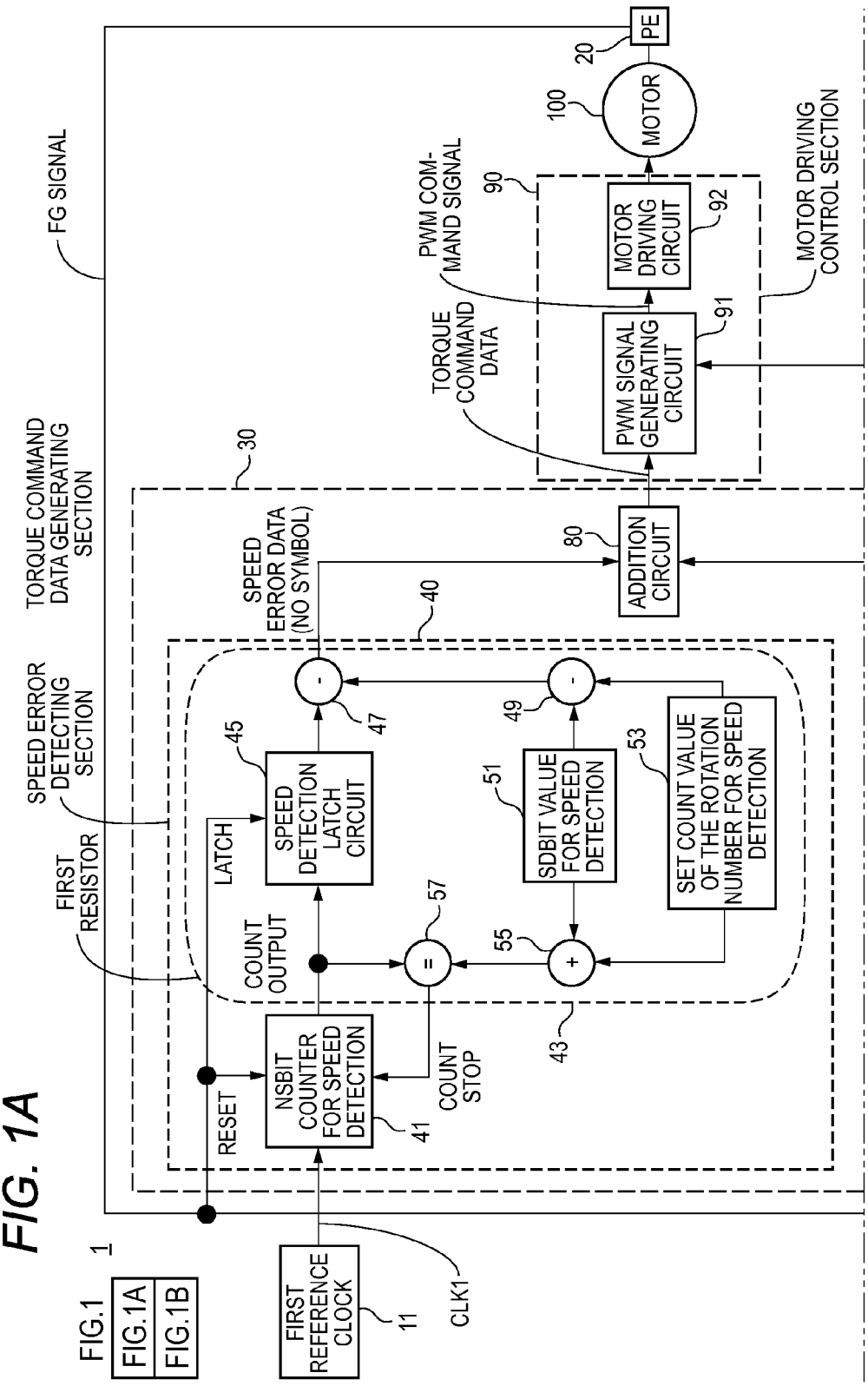
FIG. 1 (FIGS. 1A and 1B) is a view showing configuration of a motor control circuit according to Embodiment 1.

FIG. 1 is a view showing configuration of a motor control circuit according to Embodiment 1 of the present invention.

[Configuration of a Motor Control Circuit 1]

With reference to FIG. 1, a motor control circuit 1 carries out control to rotate a motor 100. The motor control circuit 1 includes a speed detecting section 20 (indicated as PE in FIG. 1), a torque command data generating section 30 (hereinafter, referred to as a generating section), and a motor driving control section 90.

The speed detecting section 20 detects a FG signal (example of a speed pulse) of a frequency corresponding to a rotation speed of the motor 100. The FG signal is transmitted to the generating section 30.

Based on the FG signal detected by the speed detecting section 20, the generating section 30 generates torque command data. The generated torque command data are input into the motor driving control section 90.

In accordance with the torque command data generated by the generating section 30, the motor driving control section 90 generates a PWM command signal to drive the motor 100 and carries out control of driving of the motor 100.

Also, the motor control circuit 1 includes a first output section 11 (indicated as a first reference clock in FIG. 1) for outputting a first reference clock CLK1, a second output section 12 (indicated as a second reference clock in FIG. 1) for outputting a second reference clock CLK2, a third output section 13 (indicated as a third reference clock in FIG. 1) for outputting a third reference clock CLK3. The first reference clock CLK1 and the second reference clock CLK2 are input into the generating section 30. The third reference clock CLK3 is input into the motor driving control section 90. The third reference clock CLK3 is a reference clock for PWM control.

The generating section 30 has a speed error detecting section 40, a phase error detecting section 60, and an addition circuit 80 (example of an additional section). Based on the FG signal and the first reference clock CLK1, the speed error detecting section 40 detects speed error data. Based on the FG signal and the second reference clock CLK2, the phase error detecting section 60 detects phase error data. The speed error data are transmitted from the speed error detecting section 40 to the addition circuit 80. The phase error data are transmitted from the phase error detecting section 60 to the addition circuit 80. The addition circuit 80 adds the speed error data and the phase error data that have been input thereto, to generate and output torque command data. In other words, the generating section 30 outputs torque command data. The torque command data are transmitted to the motor driving control section 90.

The motor driving control section 90 has a PWM signal generating circuit 91 and a motor driving circuit 92. The torque command data output from the addition circuit 80 are input into the PWM signal generating circuit 91. The third reference clock CLK3 is input into the PWM signal generating circuit 91. In accordance with the torque command data and the third reference clock CLK3, the PWM signal generating circuit 91 generates a PWM command signal. The PWM command signal is transmitted to the motor driving circuit 92. In accordance with the input PWM command signal, the motor driving circuit 92 applies driving power to the motor 100, thereby driving the motor 100. That is, the motor 100 is driven by the driving power having a duty ration and a frequency, in which the duty ration is based on the torque command data and the frequency is based on the reference clock CLK3.

The speed error detecting section 40 has a speed detection counter 41 (NSbit counter for speed detection; an example of a first counter), and a first resistor 43. The first register 43 has a speed detection latch circuit 45 (an example of a first latch circuit), subtraction sections 47 and 49, a speed detection value setting section 51 (indicated as a SDbit value for speed detection in FIG. 1), a setting section 53 for setting a count value of the rotation number for speed detection (indicated as a set count value of the rotation number for speed detection in FIG. 1; hereinafter, referred to as a count value setting section 53), an addition section 55, and a comparing section 57.

The first reference clock CLK1 output from the first output section 11 is input into the speed detection counter 41. The speed detection counter 41 counts the first reference clock CLK1. The count output is transmitted to the speed detection latch circuit 45 and the comparing section 57.

The count output and the FG signal are transmitted to the speed detection latch circuit 45. The speed detection latch circuit 45 latches the count value input from the speed detection counter 41 with a FG signal. The speed detection latch circuit 45 transmits the latched count value to the subtraction section 47.

The speed detection value setting section 51 and the count value setting section 53 configure a first setting section for setting a speed error detection range in the speed error detecting section 40. The speed detection value setting section 51 outputs a set value for speed detection (an example of a first value; hereinafter, referred to as SDbit) to the subtraction section 49 and the addition section 55, respectively. The count value setting section 53 outputs a count value for speed detection (the set count value of the rotation number for speed detection) to the subtraction section 49 and the addition section 55, respectively. The SDbit and the count value for speed detection are pre-set values.

The subtraction 49 carries out subtraction processing based on the SDbit and the count value for speed detection that have been input thereto, and outputs the values to the subtraction section 47. The subtraction section 47 carries out subtraction processing based on the count value latched in the speed detection latch circuit 45 and the value transmitted from the subtraction section 49, and outputs speed error data. In other words, the speed error data are detected based on the set content of the first setting section and the value latched in the speed detection latch circuit 45. The speed error data are output as a value having no symbol.

The addition section 55 adds the SDbit and the count value for speed detection that have been input thereto, and outputs the added value to the comparing section 57. If the value output from the addition section 55 is the same as the count output, the comparing section 57 causes the speed detection counter 41 to output a count stop signal.

In addition to the first reference clock CLK1, the FG signal and the count stop signal from the comparing section 57 are input into the speed detection counter 41. If the count stop signal is input, the speed detection counter 41 stops the count in response to the signal. If the FG signal is input, the speed detection counter 41 resets the count and starts recounting.

The phase error detecting section 60 has a phase detection counter 61 (NPbit counter for phase detection; an example of a second counter), and a second resister 63. The second resister 63 has a phase detection latch circuit 65 (an example of a second latch circuit), subtraction sections 67 and 69, a phase detection value setting section 71 (indicated as a PDbit value for phase detection in FIG. 1), a setting section 73 for setting a count value of the rotation number for phase detection (indicated as a set count value of the rotation number for phase detection in FIG. 1; hereinafter, referred to as a count value setting section 73), and a comparing section 77.

For example, the phase detection counter 61 is a free-run counter. The second reference clock CLK2 output from the second output section 12 is input into the phase detection counter 61. The phase detection counter 61 counts the second reference clock CLK2. The count output is transmitted to the phase detection latch circuit 65 and the comparing section 77.

The count output and the FG signal are transmitted to the phase detection latch circuit 65. The phase detection latch circuit 65 latches the count value input from the phase detection counter 61 with a FG signal. The phase detection latch circuit 65 transmits the latched count value to the subtraction section 67.

The phase detection value setting section 71 and the count value setting section 73 configure a second setting section for setting a phase error detection range in the phase error detecting section 60. The phase detection value setting section 71 outputs a set value for phase detection (an example of a second value; hereinafter, referred to as PDbit) to the subtraction section 69. The count value setting section 73 outputs a count value for phase detection (the set count value for the rotation number for phase detection) to the subtraction section 69 and the comparing section 77, respectively. The PDbit and the count value for phase detection are pre-set values. In Embodiment 1, the set count value of the rotation number for phase detection, which is the count value for phase detection, is the same as the second reference count value.

The subtraction section 69 carries out subtraction processing based on the PDbit and the count value for phase detection that have been input thereto, and outputs the subtracted value to the subtraction section 67. The subtraction section 67 carries out subtraction processing based on the count value latched in the phase detection latch circuit 65 and the value transmitted from the subtraction section 69, and outputs phase error data. That is, phase error data are detected based on the set content of the second setting section and the value latched in the phase detection latch circuit 65. The phase error data are output as a value having a symbol.

If the count value for phase detection output from the count value setting section 73 is same as the count output, the comparing section 77 outputs a signal to reset the phase detection counter 61. If the signal from the comparing section 77 is input, the phase detection counter 61 resets the count and starts recounting.

Here, the first output section 11 is capable of adjusting the frequency of the first reference clock CLK1. The second output section 12 is capable of adjusting the frequency of the second reference clock CLK2. The third output section 13 outputs the third reference clock CLK3 independently from the first reference clock CLK1 and the second reference clock CLK2.

For example, since the first output section 11, the second output section 12, and the third output section 13 are configured as set explained below, they are capable of outputting the reference clocks, respectively. That is, each of the first output section 11 and the second output section 12 includes a divider (not illustrated), and a division setting section (not illustrated) for carrying out setting of the divider. Predetermined reference clocks that are output from an oscillator, not illustrated, are input into the divider of the first output section 11 and the divider of the second output section 12, respectively. Here, the predetermined reference clocks have higher frequencies than those of the first reference clock CLK1 and the second reference clock CLK2. The dividers divide and output the predetermined reference clocks based on settings by the division setting section, such that the first output section 11 and the second output section 12 output the first reference clock CLK1 and the second reference clock CLK2, for which frequencies have been adjusted, respectively. That is, the two reference clocks CLK1 and CLK2 can be output by one oscillator.

The third output section 13 outputs the third reference clock CLK3, for example, by using a different oscillator from the oscillator of the first output section 11 and the second output section 12. As such, even if the frequency of the first reference clock CLK1 or the second reference clock CLK2 has been adjusted, it does not influence the frequency of the third reference clock CLK3. Even if the frequency of the first reference clock CLK1 or the second reference clock CLK2 is adjusted, it does not influence the frequency of the PWM command signal. In other words, the motor driving control section 90 carries out control of driving of the motor 100, based on the third reference clock CLK3 for PWM control, which is independent from the first reference clock CLK1 and the second reference clock CLK2.

In Embodiment 1, the count value for speed detection and the frequency of the first reference clock CLK1 are set, in accordance with the set rotation number of the motor 100, for the speed error detecting section 40. The speed error detecting section 40 outputs a cycle of the FG signal, which is output in accordance with the speed of the motor 100, as speed error data.

[Operation of the Speed Error Detecting Section 40]

In Embodiment 1, the speed error detecting section 40 operates as explained below.

First, the speed detection counter 41 counts the first reference clock CLK1. The speed detection latch circuit 45 latches the count output at rise or decay timing of the FG signal. Here, for the number of counts of the speed detection counter 41, the number of counts obtained by adding the SDbit to the set count value of the rotation number is set. That is, the first reference clock CLK1 is counted in a predetermined range (an example of a first predetermined range) obtained by adding the SDbit to the pre-set count value for speed detection.

In the first resister 43, the count value output from the speed detection latch circuit 45, and the first reference count value obtained by subtracting the SDbit from the set count value for speed detection are compared, and speed error data are detected. As described hereafter, the speed error data are output in a predetermined range based on a value obtained by subtracting the SDbit from the count value for speed detection. The speed error data are obtained as data having no symbol.

The speed detection counter 41 resets the count of the first reference clock CLK1 and starts recounting, at rise or decay timing of the FG signal. Accordingly, the speed error data are output in accordance with timing of the FG signal.

If the FG signal is not input during a period of time until the count of the first reference clock CLK1 reaches the first reference count value, the speed error detecting section 40 stops the count of the first reference clock CLK1.

Figure 2:
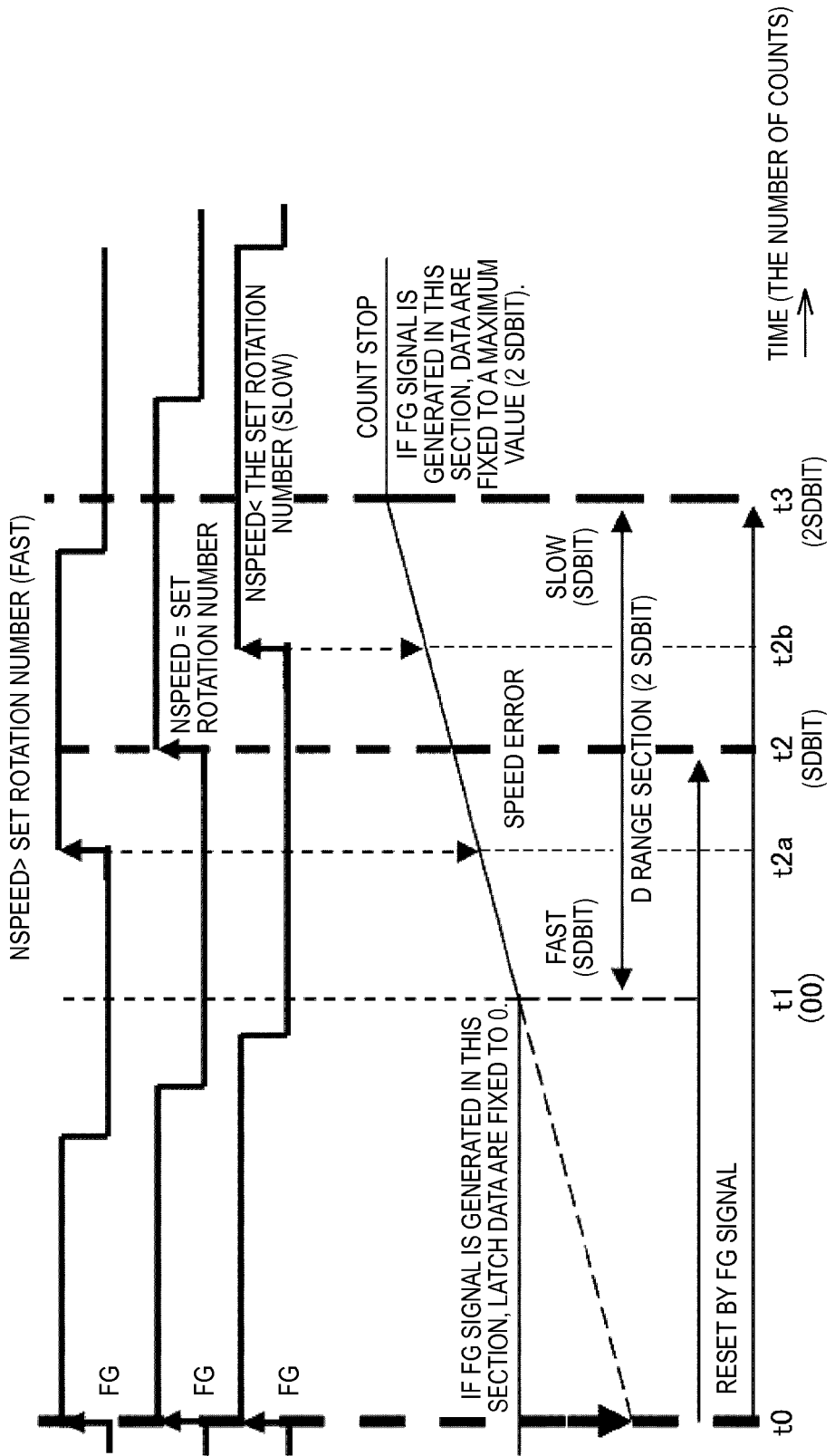
FIG. 2 is a time chart showing operation of a speed error detecting section.

FIG. 2 is a time chart showing operation of the speed error detecting section 40.

The time chart of FIG. 2 illustrates, in order from the top of the time chart, transition of the FG signal in the case where the rotation number (Nspeed) of the motor is higher than the set rotation number, transition of the FG signal in the case where the rotation number of the motor is the same as the set rotation number, transition of the FG signal in the case where the rotation number of the motor is lower than the set rotation number, and transition of speed error data when rise of the FG signal occurs.

The FG signal rises at time t0 of the left end of FIG. 2, and at this time, the count of the first reference clock CLK1 is reset. When the rotation number of the motor is the same as the set rotation number (Nspeed=the set rotation number), the next FG signal rises at time t2 after count is carried out as much as the count value for speed detection from the time t0. When the rotation number of the motor is higher than the set rotation number (Nspeed>the set rotation number), the next FG signal rises at time t2a earlier than time t2. When the rotation number of the motor is lower than the set rotation number (Nspeed<the set rotation number), the next FG signal rises at time t2b later than the time t2.

In Embodiment 1, the speed error data have a value ranging from zero, which is a value obtained by subtracting the SDbit from the set count value of the rotation number, to 2 SDbit. Here, the SDbit is set to satisfy the relation (NSbit>2*SDbit), in which the number of counts NSbit of the speed detection counter 41 is two or more times higher than the SDbit. That is, the SDbit is set to a value smaller than a half of the number of counts NSbit of the speed detection counter 41.

As illustrated in FIG. 2, if rise of the FG signal occurs during a period of time from time t1 earlier by the SDbit than time t2 corresponding to the set count value of the rotation number, to time t3 later by the SDbit than the time t2 (this time period is also referred to as a D range (section) and corresponds to the 2 SDbit based on the time corresponding to the set count value of the rotation number), the speed error data are output in accordance with the timing of the rise of the FG signal. When rise of the FG signal occurs at timing earlier than the time t1, namely, timing earlier than starting of the D range, the speed error data are fixed to zero. When rise of the FG signal occurs at timing later than the time t2, namely, after the D range is terminated, the speed error data is fixed to the maximum value of 2 SDbit. That is, if the FG signal is not input during the period of time till the time t2 when the count of the first reference clock CLK1 reaches the first reference count value, the count of the first reference clock CLK1 is stopped, such that the speed error data are fixed to the maximum value of 2 SDbit. Accordingly, regardless of the rotation number of the motor 100, it is ensured that the value of the speed error data falls within the same range as the value of the speed error data in the case where the FG signal ascends in the D range.

[Operation of the Phase Error Detecting Section 60]

In Embodiment 1, the phase error detecting section 60 operates as explained below.

First, the phase detection counter 61 counts the second reference clock CLK2. The phase detection latch circuit 65 latches the count output at rise or decay timing of the FG signal. Here, for the number of counts of the phase detection counter 61, the same value as the set count value of the rotation number (count value for phase detection) is set. That is, the second reference clock CLK2 is counted in a predetermined range (an example of a second predetermined range) based on the pre-set count value for speed detection.

In the second resistor 63, the count value output from the phase detection latch circuit 65 and the pre-set count value for phase detection are compared, and phase error data are output. As described hereafter, the phase error data are output in a predetermined range based on a value obtained by subtracting the PDbit from the count value for phase detection, as data having a symbol.

When the count value of the second reference clock CLK2 reaches to the count value for phase detection, a signal is transmitted from the comparing section 77 to the phase detection counter 61. Based on the signal, the phase detection counter 61 resets the count of the second reference clock CLK2 and starts recounting.

Figure 3:
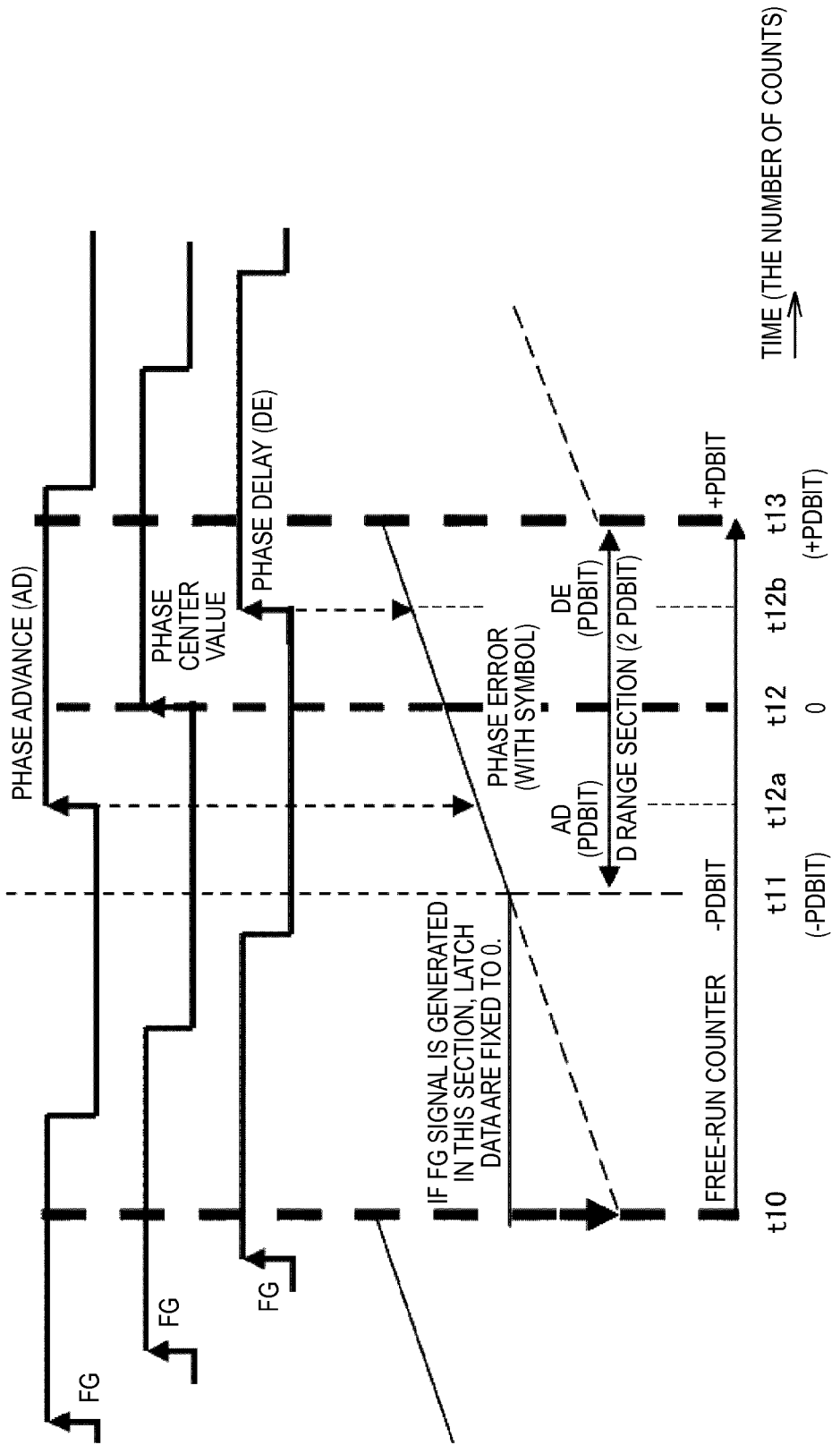
FIG. 3 is a time chart showing operation of a phase error detecting section.

FIG. 3 is a time chart showing operation of the phase error detecting section 60.

The time chart of FIG. 3 illustrates transition of the FG signal in the case where a phase of the motor is advanced, transition of the FG signal in the case where a phase of the motor is a phase center value, transition of the FG signal in the case where a phase of the motor is delayed, and transition of phase error data when rise of the FG signal occurs.

The count of the second reference clock CLK2 is reset, when the D range is terminated as described hereafter, at time t10 of the left end of FIG. 3, namely, when the count output of the phase detection counter 61 is the same as the count value for phase detection. Once the count is reset, the phase detection counter 61 starts counting again.

In Embodiment 1, the count value for phase detection is set to correspond to the set rotation number of the motor 100. The count value for phase detection and the PDbit are set such that when a phase of the motor is a phase center value, the phase error data are zero. The phase error data are output as data having a symbol in a range of ±PDbit based on zero, which is a value obtained by subtracting the PDbit from the count value for phase detection corresponding to the set rotation number. That is, a value obtained by subtracting 2 PDbit from the count value for phase detection is −PDbit, and the count value for phase detection is +PDbit. Here, the PDbit is set to satisfy the relation (NPbit>2*PDbit), in which the number of counts NPbit of the count 61 for phase detection is two or more times higher than the PDbit. That is, the PDbit is set to a value smaller than a half of the number of counts NPbit of the phase detection counter 61.

When a phase of the motor is the same as a phase center value, the next FG signal rises at time t12 after count is carried out from the time t10 as much as a value obtained by subtracting the PDbit from the count value for phase detection. When a phase of the motor is advanced (AD), the next FG signal rises at time t12a earlier than the time t12. When a phase of the motor is delayed (DE), the next FG signal rises at time t12b later than the time t12.

As illustrated in FIG. 3, the phase error data are detected in a range of ±PDbit based on zero, which is the time t12 corresponding to a value obtained by subtracting the PDbit from the set count value of the rotation number (the range is also referred to as a D range). That is, the D range is a section ranging from time t11 (−PDbit) earlier by the PDbit than the time t12 to time t13 (+PDbit) later by the PDbit than the time t12.

When rise of the FG signal occurs at timing earlier than the time t11, namely, timing earlier than starting of the D range, the phase error data are fixed to zero. In other words, when rise of the FG signal occurs at timing later than the time t12, namely, after the D range is terminated, the phase error data are fixed to zero. Accordingly, regardless of the phase of the motor 100, it is ensured that the value of the phase error data falls within the same range as the value of the phase error data in the case where the FG signal ascends in the D range.

[Setting a Control Gain and a Control Range by a Reference Clock Frequency]

Since the motor control circuit 1 is configured as described above, in Embodiment 1, setting a control gain and a control range of the motor 100 can be carried out, by adjusting the frequency of the reference clock for speed detection and the frequency of the reference clock for phase detection.

Figure 4:
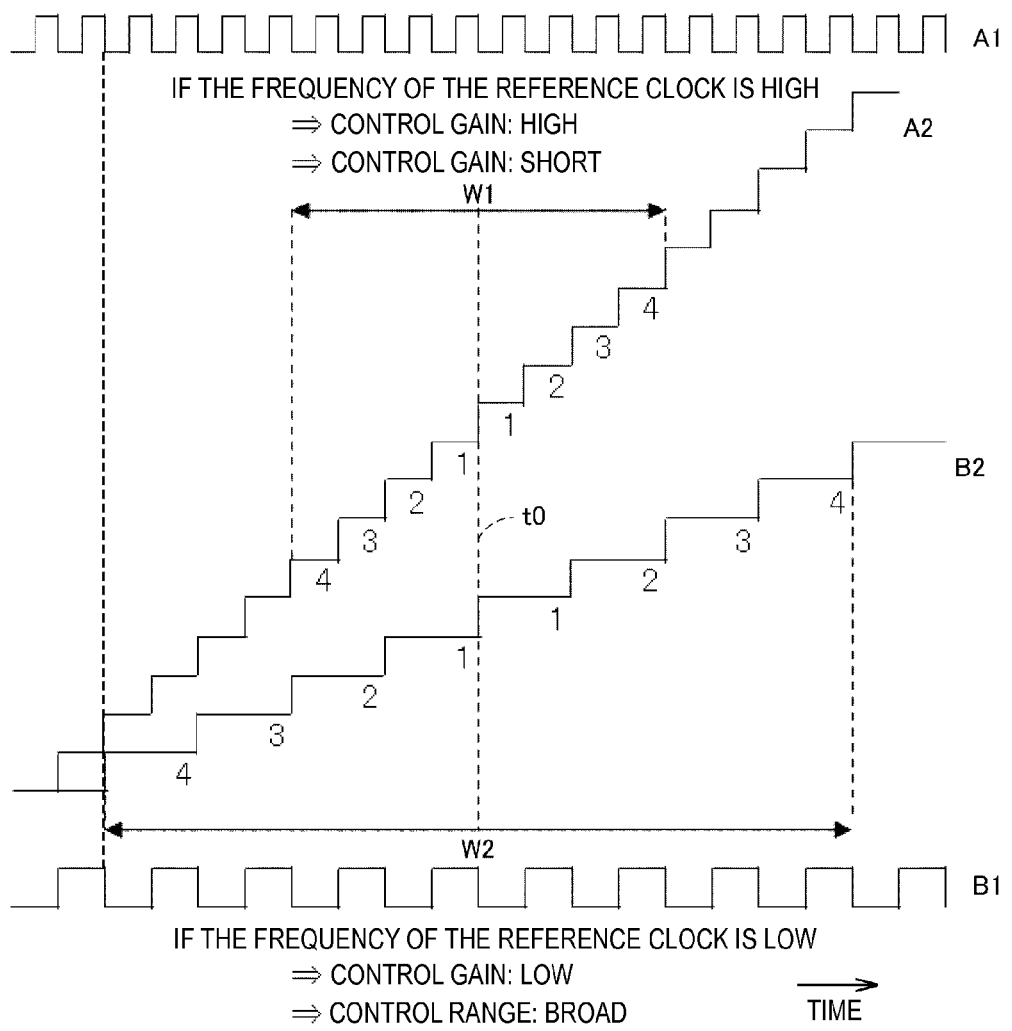
FIG. 4 is a view showing a relation between a frequency of a reference clock, and a control gain and a control range.

FIG. 4 is a view for explanation of a relation between a frequency of a reference clock, and a control gain and a control range.

FIG. 4 shows comparison between a pulse wave (A1) of the reference clock in the case where the frequency of the reference clock is high (upward) and transition (A2) of the count thereof, and a pulse wave (B1) of the reference clock in the case where the frequency of the reference clock is low and transition (B2) of the count thereof. FIG. 4 shows a range W1 in case of the high frequency and a range W2 in case of the low frequency, in the range, in which the time t0 is reference timing, and the number of counts is ±4 based on the reference timing.

With reference to FIG. 4, when the frequency of the reference clock is high, the number of pulses of the reference clock within predetermined time is relatively high, and the number of counts increases in short time, compared to when the frequency of the reference clock is low. That is, upon comparing the range W1 in case of the high frequency and the range W2 in case of the low frequency, the range W1 in case of the high frequency is narrower than the range W2 in case of the low frequency. Accordingly, upon comparing the case where the frequency of the reference clock is high and the case where the frequency of the reference clock is low, in the case where the frequency of the reference clock is high, a control gain is high, and the control range W1 is narrow. In the case where the frequency of the reference clock is low, a control gain is reduced, and the control range W2 is broad.

In Embodiment 1, the frequency of the first reference clock CLK1 is adjusted, such that a gain and a range of speed system control using the speed error detecting section 40 are set. The frequency of the second reference clock CLK2 is adjusted, such that a gain and a range of phase system control using the phase error detecting section 60 are set.

Adjusting frequencies can be carried out by adjusting division settings by the division setting sections of the output sections 11 and 12. A reference clock of a predetermined frequency is divided, such that a reference clock, for which a frequency has been adjusted, is prepared. That is, in the first output section 11, division setting (speed gain setting) is adjusted, such that the frequency of the first reference clock CLK1 can be adjusted. Once the first reference clock CLK1 is adjusted, a speed error output from the speed error detecting section 40 varies, and a gain and a range of speed system control are set. In the second output section 12, division setting (phase gain setting) is adjusted, such that the frequency of the second reference clock CLK2 can be adjusted. Once the second reference clock CLK2 is adjusted, a phase error output from the phase error detecting section 60 varies, and a gain and a range of phase system control are set.

[Effects in Embodiment 1]

In Embodiment 1, the frequency of the first reference clock CLK1 and the frequency of the second reference clock CLK2 are adjusted such that a driving gain of the motor 100 can be adjusted. That is, adjusting a driving gain can be carried out, in the state where the frequency of the third reference clock CLK3 input into the PWM signal generating section 91 for PWM duty count is maintained (fixed).

Figure 5:
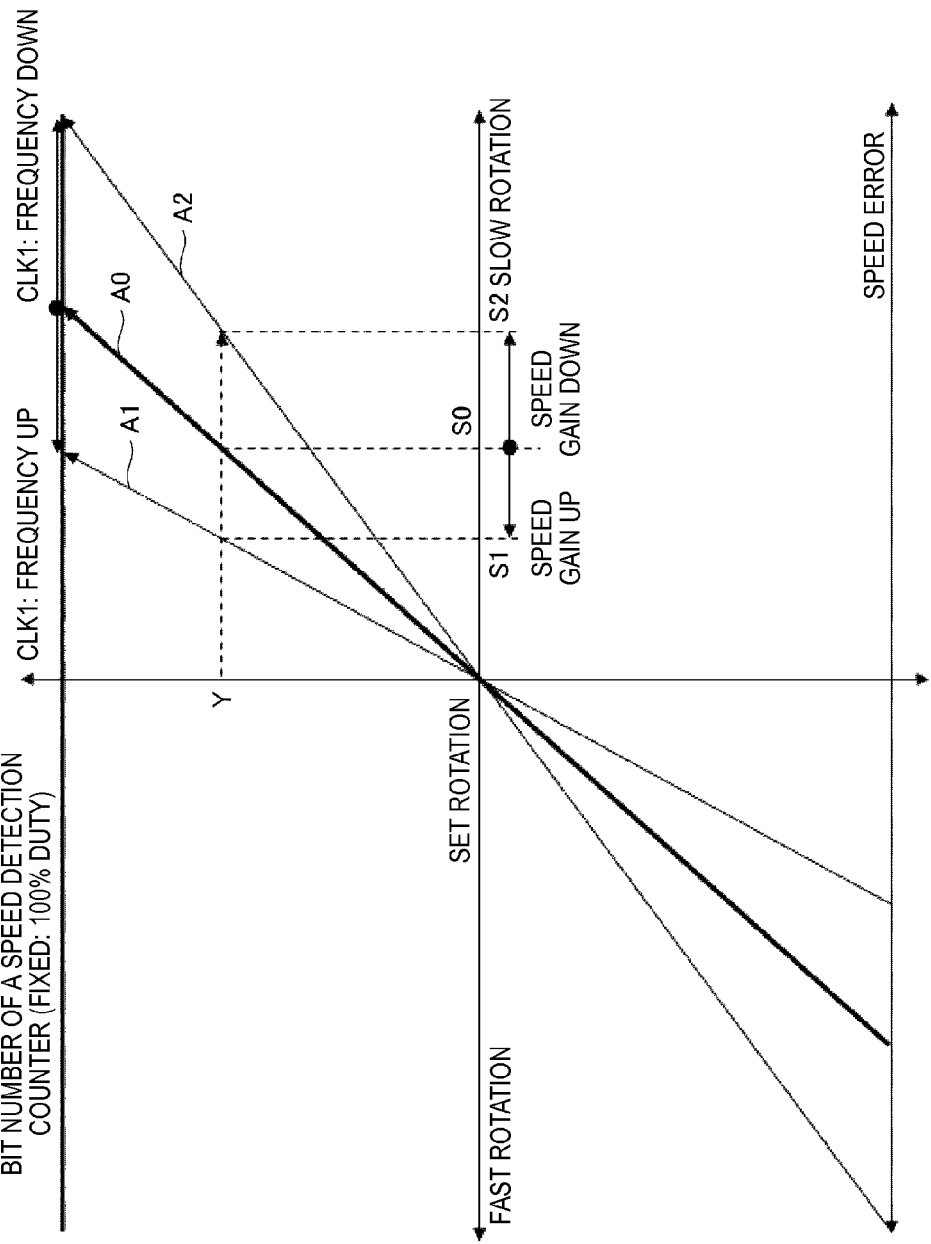
FIG. 5 is a view for explanation of effects in Embodiment 1.

FIG. 5 is a view for explanation of effects in Embodiment 1.

In FIG. 5, the horizontal axis indicates a speed deviation, and the vertical axis indicates the number of counts of the speed detection counter 41. As to the horizontal axis, the rightward direction, toward which the speed deviation increases, corresponds to the direction, toward which the rotation speed of the motor slows down. The intersection point of the horizontal axis and the vertical axis indicates the state where the speed deviation is zero, namely, the rotation speed is consistent with the set rotation number. The inclination of the straight lines on the X-Y coordinates indicates a control gain of PWM driving. As the inclination of the straight lines increases, variation of the number of counts of the speed detection counter 41 to variation of the speed deviation increases. In other words, as the inclination of the straight lines increases, a control gain increases.

As described, a control gain of the speed system can be set by adjustment of the frequency of the first reference clock CLK1. Based on the time when the relation between the speed error and the duty ratio is the relation indicated by the straight line A0 in FIG. 5, when the frequency of the reference clock CLK1 of PWM1 increases, the relation between the speed error and the duty ratio is changed to the relation indicated by the straight line A1 in FIG. 5. In this case, the speed error corresponding to a certain duty ratio Y is changed from S0 to S1 smaller than S0, prior to and after the frequency increases. When the frequency of the first reference clock CLK1 decreases, the relation between the speed error and the duty ratio is changed to the relation indicated by the straight line A2 in FIG. 5. In this case, the speed error corresponding to the certain duty ratio Y is changed from S0 to S2 larger than S0, prior to and after the frequency of the first reference clock CLK1 decreases. That is, when the frequency of the first reference clock CLK1 increases, a driving control gain (speed gain) increases. When the frequency of the first reference clock CLK1 decreases, the driving control gain decreases.

As described above, in Embodiment 1, a control gain of the speed system can be adjusted by fixing the frequency of the third reference clock CLK3, while assuring the control range up to the 100% PWM duty. Similarly, for a control gain of the phase system, the same effect as that for the control gain of the speed system can be achieved. That is, the control gain of the phase system can also be adjusted, by adjusting the frequency of the second reference clock CLK2 independently from the third reference clock CLK3, while fixing the frequency of the third reference clock CLK3. Accordingly, the control gain of the phase system can be adjusted while assuring the control range up to the 100% PWM duty.

The frequency of the first reference clock CLK1 of the speed detection counter 41 and the frequency of the second reference clock CLK2 of the phase detection counter 61 can be changed without influencing the third reference clock CLK3 for the PWM duty count. Accordingly, the motor control circuit 1 can adjust a control gain of the motor 100 as a whole, while assuring the broad control range.

The motor control circuit 1 is configured by a simple digital circuit, and does not utilize a circuit, which causes the number of digital gates to increase, such as a digital multiplying device. Accordingly, costs for manufacturing the motor control circuit 1 can be reduced. The motor control circuit 1 can be realized by IC without utilizing any external analogue component.

[Embodiment 2]

Since basic configuration of a motor control circuit according to Embodiment 2 is the same as that according to Embodiment 1, explanation thereof is not repeated herein. Embodiment 2 provides different configuration of a phase error detecting section from that in Embodiment 1. The motor control circuit in Embodiment 2 is the motor control circuit in Embodiment 1, in which the phase error detecting section is replaced with a phase error detecting section as explained below.

Figure 6:
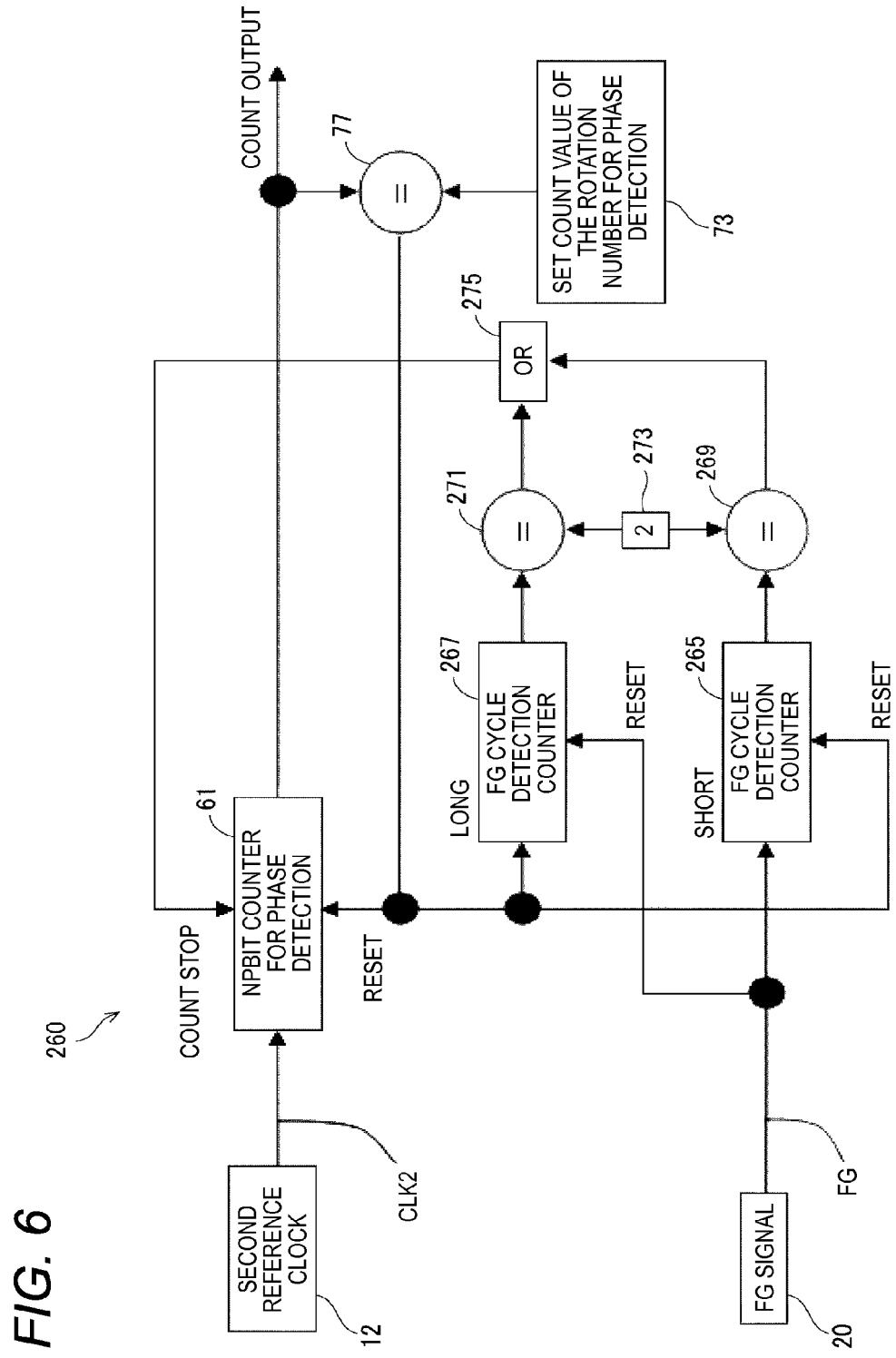
FIG. 6 is a view showing part of configuration of a phase error detecting section of a motor control circuit according to Embodiment 2.

FIG. 6 is a view showing a part of configuration of a phase error detecting section 260 of a motor control circuit 1 in Embodiment 2.

With reference to FIG. 6, the phase error detecting section 260 has a phase detection counter 61 (Nbit counter for phase detection), a count value setting section 73 (a set count value of the rotation number for phase detection), and a comparing section 77. Also, the phase error detecting section 260 has comparing sections 263, 269, 271, and 273, a first FG cycle detection counter 265, a second FG cycle detection counter 267, and an OR section 275. Although not illustrated in FIG. 6, the phase error detecting section 260 further includes a phase detection latch circuit 65, subtraction sections 67 and 69, and a phase detection value setting section 71 (PDbit value for phase detection), like the phase error detecting section 60 of Embodiment 1. That is, FIG. 6 illustrates a part of configuration of the phase error detecting section 260.

The second reference clock CLK2 from the second output section (indicated as a second reference clock in FIG. 6) is input into the phase detection counter 61. A FG signal from the speed detecting section 20 (indicated as a FG signal in FIG. 2) is input into the first FG cycle detection counter 265 and the second FG cycle detection counter 267. As in Embodiment 1, the FG signal is input into the phase detection latch circuit 65. The phase detection latch circuit 65 latches the count output in accordance with the FG signal.

The first FG cycle detection counter 265 counts the FG signal, and outputs it to the comparing section 269. A signal from the comparing section 77 is input into the first FG cycle detection counter 265. When the signal from the comparing section 77 is input, the first FG cycle detection counter 265 resets the count value, and starts counting again. The first FG cycle detection counter 265 is provided to detect a "short FG cycle" as explained below.

The signal from the comparing section 77 is input into the second FG cycle detection counter 267. The second FG cycle detection counter 267 counts the signal from the comparing section 77, and outputs it to the comparing section 271. When the FG signal is input, the second FG cycle detection counter 267 resets the count value, and starts counting again. The second FG cycle detection counter 267 is provided to detect a "long FG cycle" as explained below.

The comparing section 273 outputs a value to the comparing sections 269 and 271. In Embodiment 2, the comparing section 273 outputs "2." Each of the comparing sections 269 and 271 compares the count value input from the first FG cycle detection counter 265 or the second FG cycle detection counter 267, and the value input from the comparing section 273. If both the values are the same, a signal is output.

The signal from each of the comparing sections 269 and 271 is input into the OR section 275. When the signal from any one of the comparing sections 269 and 271 is input, the OR section 275 outputs a count stop signal to the phase detection counter 61.

In addition to the signal from the comparing section 77, the count stop signal from the OR section 275 is input into the phase detection counter 61. When the signal from the comparing section 77 is input, the phase detection counter 61 resets the count of the second reference clock CLK2. When the count stop signal is input from the OR section 275, the phase detection counter 61 stops the count of the second reference clock CLK2.

Since the phase error detecting section 260 is configured as described above, if a cycle (hereinafter, referred to as a counter cycle) corresponding to the count value for phase detection, which is the set count value of the rotation number, and a cycle of the FG signal (hereinafter, referred to as a FG cycle) are different from each other, the phase detection counter 61 stops the count. That is, in the first case where the FG cycle is longer than the counter cycle, or in the second case where the FG cycle is shorter than the counter cycle, the count of the phase detection counter 61 is stopped.

In the first case where the FG cycle is longer than the counter cycle, if the count is continued to be carried out in the state where the FG signal does not come out during a period of time (an example of a first period of time) until reset of the phase detection counter 61 occurs two times, phase error data thereafter are reversed from a maximum value to a minimum value. In Embodiment 2, in the first case, when the FG signal does not come out until reset of the phase detection counter 61 occurs two times, namely, when the second FG cycle detection counter 267 counts reset of the phase detection counter 61 two times, the phase detection counter 61 is stopped. In other words, in the first case, the count of the phase detection counter 61 is stopped if the FG signal does not come out within a period of time, during which the following process is carried out two times: the count of the second reference clock CLK2 is started by the phase detection counter 61, and then the count value reaches the count value for phase detection such that the count of the second reference clock CLK2 is reset. The count value is maintained, such that phase error data are maintained at a maximum value. Accordingly, torque command data output by the addition circuit 80 have a maximum value, so that control to accelerate the motor 100 is carried out. As a result, the rotation number of the motor 100 can surely approach the set rotation number.

Figure 7:
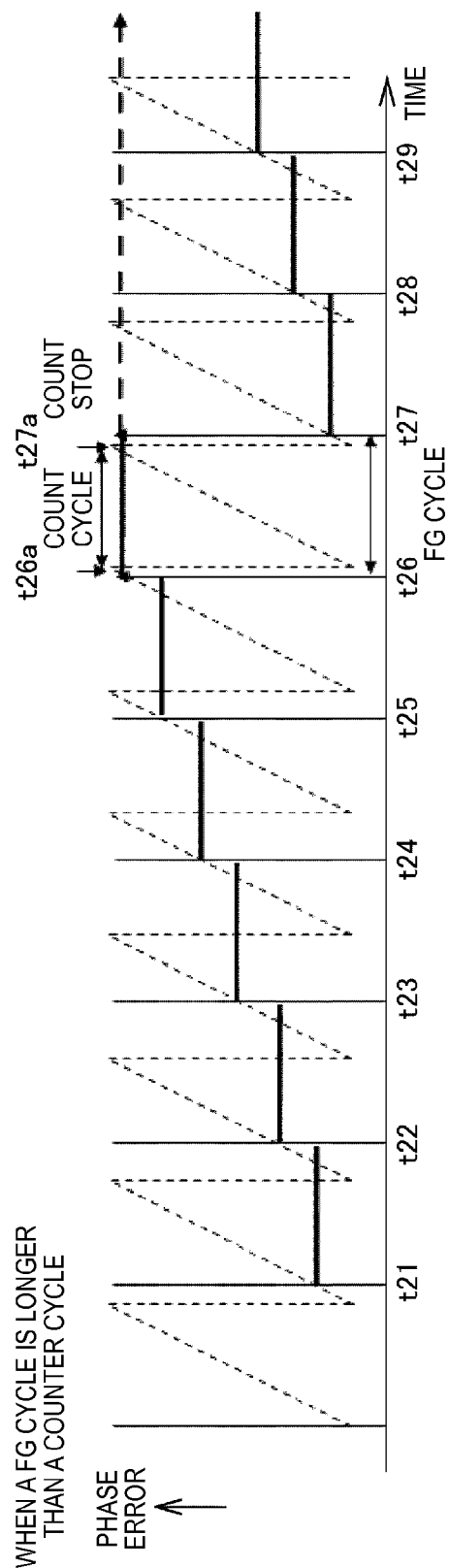
FIG. 7 is a time chart showing operation of a phase error detecting section in a first case where a FG cycle is longer than a counter cycle.

FIG. 7 is a time chart showing operation of the phase error detecting section 260 in the first case where the FG cycle is longer than the counter cycle. One example of the operation will be described with reference to FIG. 7. In the first case, since the FG cycle (e.g., from time t26 to time t27) is longer than the counter cycle (e.g., time t26a to time t27a), a phase error gradually continuously increases each time the FG signal is transmitted during a period of time from the time t21 to the time t27. However, after the count value is reset at the time t26a after the time t26, the count value is reset again at the time t27a prior to the time t27 (a second reset occurs). Accordingly, if the count is continued to be carried out, the phase error becomes smaller than the previous phase error after the time t27. In Embodiment 2, when the FG signal is transmitted at the time t26, and then the count of the phase detection counter 61 reaches the count value for phase detection again at the time t27a, a count stop signal is transmitted from the OR section 275 to the phase detection counter 61, so that the count is stopped. In this case, the count value is maintained such that the phase error data are maintained at the maximum value. Accordingly, the phase error data output at the times t28, t29, and the following times after the time t27 are maintained at the maximum value as indicated by a bold dashed line in FIG. 7.

In the second case where the FG cycle is shorter than the counter cycle, if the count is continued to be carried out in the state where reset of the phase detection counter 61 does not occur in a period of time (an example of a second period of time) until the FG signal is generated two times, phase error data thereafter are reversed from the minimum value to the maximum value. In Embodiment 2, in the second case, when reset of the phase detection counter 61 does not occur until the FG signal is generated two times, namely, when the first FG cycle detection counter 265 counts the FG signal two times, the phase detection counter 61 is stopped. In other words, the count of the phase detection counter 61 is stopped if the following process is not carried out: the count of the second reference clock CLK2 is started by the phase detection counter 61, and then the count value reaches the count value for phase detection such that the count of the second reference clock CLK2 is reset, during a period of time until the FG signal is input consecutive two times. In this case, the count value is maintained, such that the phase error data are maintained at the minimum value. Accordingly, the torque command data output by the addition circuit 80 have the minimum value, so that control to decelerate the motor 100 is carried out. As a result, the rotation number of the motor 100 can surely approach the set rotation number.

Figure 8:
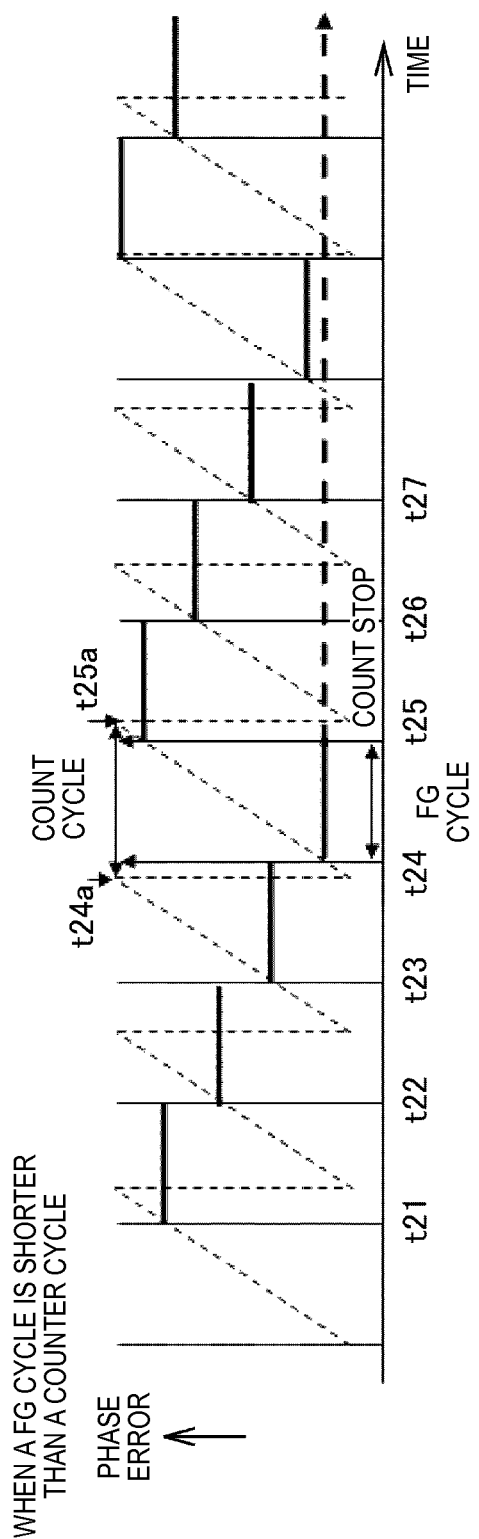
FIG. 8 is a time chart showing operation of a phase error detecting section in a second case where a FG cycle is shorter than a counter cycle.
Figure 9:
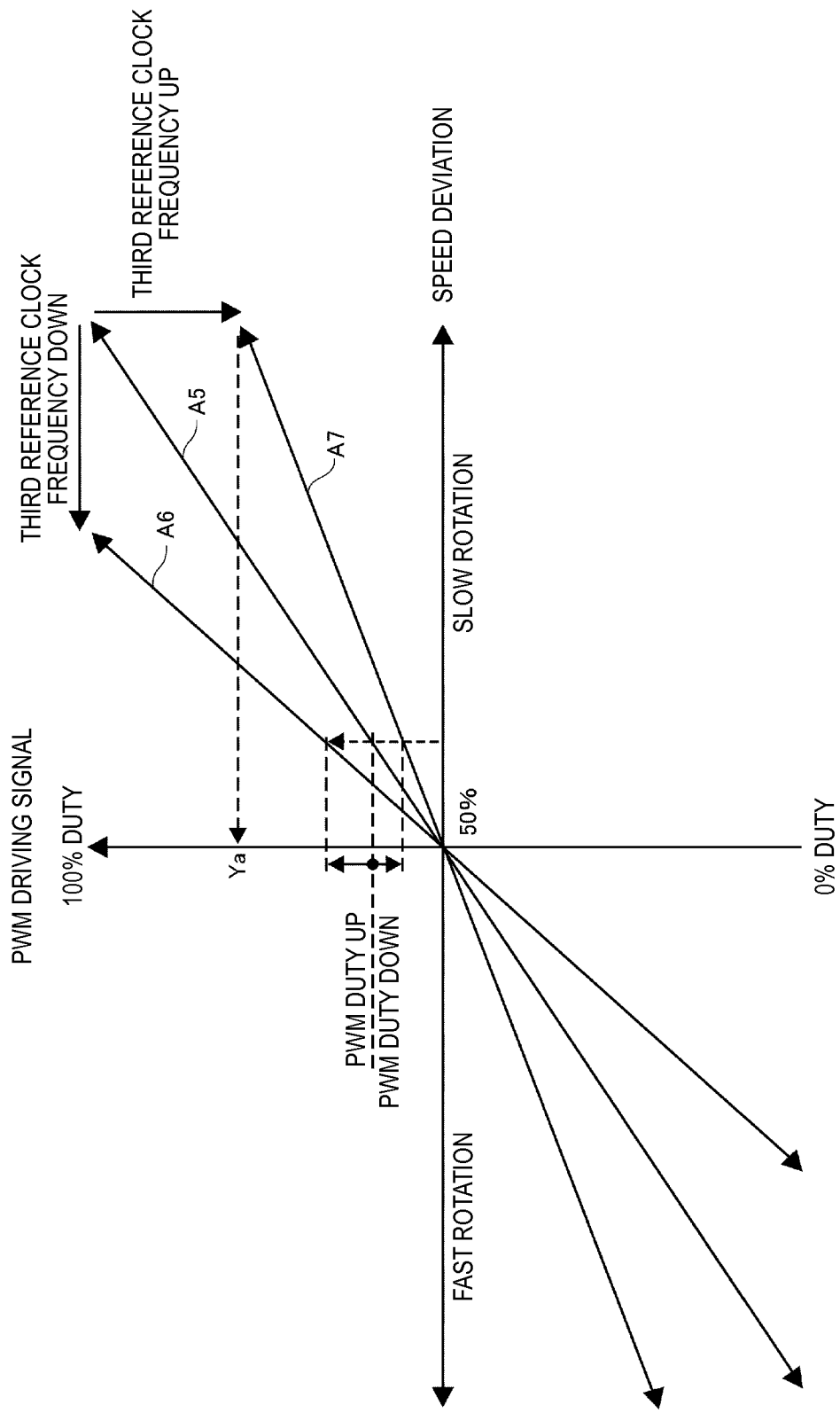
FIG. 9 is a graph showing a relation between a speed deviation and a duty of a PWM driving signal in a related-art motor control circuit.
Figure 10:
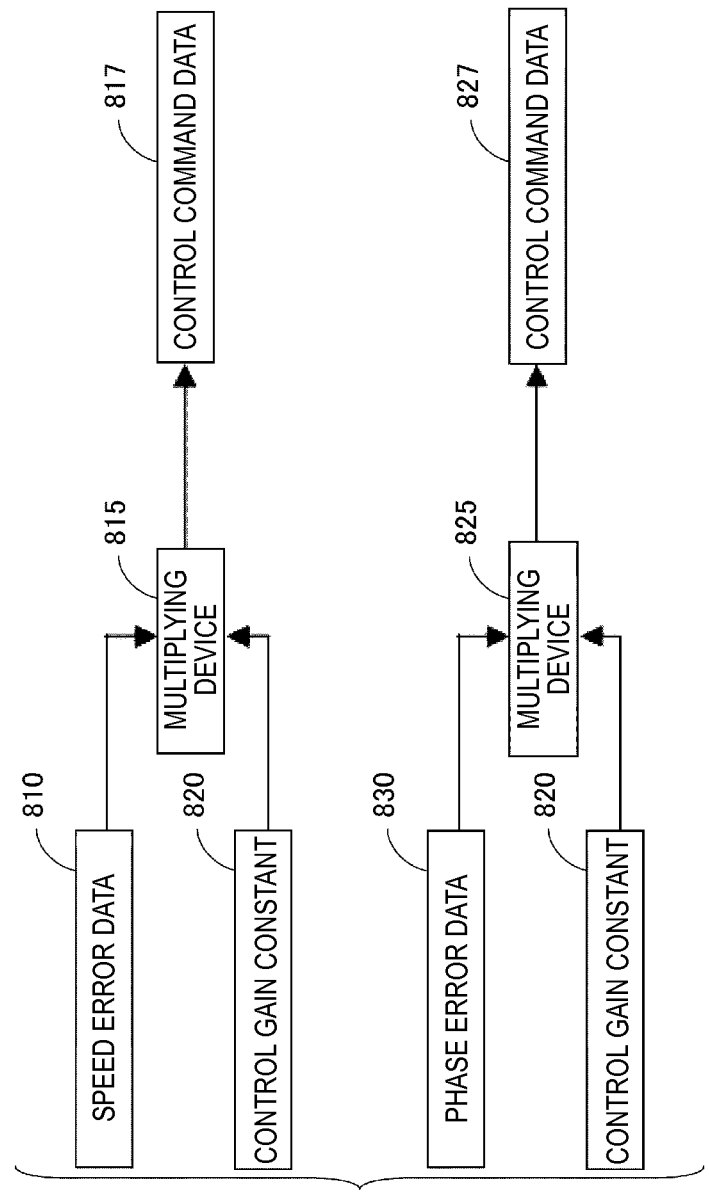
FIG. 10 is a view for explanation of gain control using a related-art digital multiplying device.

FIG. 8 is a time chart showing operation of the phase error detecting section 260 in the second case where the FG cycle is shorter than the counter cycle.

An example of the above-described operation will be described with reference to FIG. 8. In the second case, since the FG cycle (e.g., from time t24 to time t25) is shorter than the counter cycle (e.g., time t24a to time t25a), the phase error gradually becomes small continuously while time t24 to time t25 each time the FG signal comes out. However, after the counter value is reset at the time t24a earlier than the time t24 when the FG signal comes out, the counter value is reset again at the time t24a later than the time t25 when the next FG signal comes out. During that time, the FG signal comes out two times. In this case, if the count is continued to be carried out, the phase error becomes higher than the previous phase error after the time t25. In Embodiment 2, the count of the phase detection counter 61 reaches the count value for phase detection at the time t24a, and the counter value is reset. Thereafter, when the second FG signal comes out at the time t25, a count stop signal is transmitted from the OR section 275 to the phase detection counter 61 so that the count is stopped. In this case, the count value is maintained such that the phase error data are maintained at the minimum value. Accordingly, the phase error data output at the times t26 and t27, and the following times after the time t25 are maintained at the minimum value as indicated by a bold dashed line in FIG. 8.

[Effects in Embodiment 2]

In Embodiment 2, the motor control circuit 1 carries out substantially the same operation as that in Embodiment 1, with respect to the frequency of the first reference clock CLK1 and the frequency of the second reference clock CLK2. Accordingly, Embodiment 2 achieves the same effects as those in Embodiment 1.

Since the phase detection counter 61 is a free-run counter, costs for manufacturing the counter are relatively low. However, the phase detection counter 61 has disadvantages because count is continued to be carried out unless reset is carried out. In Embodiment 2, since the count of the phase detection counter 61 is stopped under a predetermined circumstance, the disadvantages can be resolved. For example, the phase detection counter 61 may be stopped in case of occurrence of the state deviating from the phase locking, in which the speed error data are smaller than the SDbit to detect the short FG cycle, so that the phase error data cause PDbit/2 or more data variation.

[Other Embodiments]

The positions of the comparing sections, the addition section, and others are not limited to the positions that have been described. The motor control circuit may be any digital circuit, which can operate in the same manner as that of the motor control circuit described in the above embodiments.

The first to third output sections may be configured to output the first to three reference clocks, respectively, based on a predetermined reference clock output from one oscillator. In this case, the number of the oscillators can be reduced. The first and third output sections, or the second and third output sections may be configured to output a reference clock, by commonly using the oscillator with each other. The first to third output sections may be configured to output the first to third reference clocks, respectively, based on reference clocks output from different oscillators. The third reference clock may have any configuration as long as not be influenced by the first or second reference clock, or both the first and second reference clocks.

In the embodiments described above, the count value for phase detection and the second reference count value are the same. However, the values may be different from each other. That is, the second reference count value, which is different from the count value for phase detection, may be input into the comparing section outputting a signal to the counter for phase detection in the phase error detecting section. For example, the count value output section, which is different from the count value setting section, may be provided in the phase error detecting section, such that the count value setting section outputs the count value for phase detection to the subtraction section, and the count value output section outputs the second reference count value to the comparing section.

In Embodiment 2, when the count of the counter for phase detection is stopped, a predetermined value may be output as phase error data. For example, zero may be output as the predetermined value. Also, when the count of the counter for phase detection is stopped, data that have been previously output may be continuously output as phase error data.

In Embodiment 2, in the first and second cases, the count of the counter for phase detection is merely stopped, and control to make the phase error data into the maximum or minimum value may not be carried out. Either the first FG cycle detection counter and the comparing section, into which the count value is input, or the second FG cycle detection counter and the comparing section, into which the count value is input, may not be provided. Even though the motor control circuit is configured as described above, the counter for phase detection can be stopped in any of the first and second cases.

While the present invention has been shown and described with reference to certain embodiments thereof, it will be understood by those skilled in the art that various changes in form and details may be made therein without departing from the spirit and scope of the invention as defined by the appended claims.

What is claimed is:

1. A motor control circuit comprising:
a speed detecting section configured to detect a speed pulse having a frequency corresponding to a rotation speed of a motor;
a generating section configured to generate torque command data based on the speed pulse detected by the speed detecting section;
a motor driving control section configured to generate a PWM command signal based on the torque command data generated by the generating section to control driving of the motor;
a first output section configured to output a first reference clock; and
a second output section configured to output a second reference clock,
wherein the generating section includes:
a speed error detecting section configured to detect speed error data;
a phase error detecting section configured to detect phase error data; and
an addition section configured to add the speed error data and the phase error data to output torque command data,
wherein the speed error detecting section includes:
a first counter configured to count the first reference clock output from the first output section;
a first latch circuit configured to latch a count value of the first counter with the speed pulse; and
a first setting section configured to set a speed error detection range,
wherein the speed error detecting section is configured to detect the speed error data based on the count value latched by the first latch circuit and set content by the first setting section,
wherein the phase error detecting section includes:
a second counter configured to count the second reference clock output from the second output section;
a second latch circuit configured to latch a count value of the second counter with the speed pulse; and
a second setting section configured to set a phase error detection range, and
wherein the phase error detecting section is configured to detect the phase error data based on the count value latched by the second latch circuit and set content by the second setting section.

2. The motor control circuit according to claim 1,
wherein the speed error detecting section is configured to count the first reference clock in a first predetermined range, detect the speed error data by comparing the count value latched at a rise or decay timing of the speed pulse and a first reference count value obtained by subtracting a first predetermined value from a pre-set count value for speed detection, and output the speed error data within the speed error detection range set by the first setting section with respect to a value obtained by subtracting the first predetermined value from the count value for speed detection, and
wherein the speed error detecting section is further configured to reset counting of and start recounting of the first reference clock at a rise or decay timing of the speed pulse.

3. The motor control circuit according to claim 2,
wherein the speed error detecting section is configured to stop counting of the first reference clock when the speed pulse is not input until a count value of the first reference clock reaches the first reference count value.

4. The motor control circuit according to claim 2,
wherein a count value of the first counter is two or more times higher than the first predetermined value.

5. The motor control circuit according to claim 1,
wherein the phase error detecting section is configured to count the second reference clock in a second predetermined range, detect the phase error data by comparing the count value latched at a rise or decay timing of the speed pulse and a pre-set count value for phase detection, and output the phase error data with a symbol within the phase error detection range set by the second setting section with respect to a value obtained by subtracting a second predetermined value from the count value for phase detection, and wherein the phase error detecting section is further configured to reset counting of and start recounting of the second reference clock when a count value of the second reference clock reaches a second reference count value for phase detection.

6. The motor control circuit according to claim 5,
wherein the phase error detecting section is configured to stop counting of the second reference clock when a cycle of the speed pulse is longer or shorter than a cycle corresponding to the count value for phase detection.

7. The motor control circuit according to claim 5,
wherein a count value of the second counter is two or more times higher than the second predetermined value.

8. The motor control circuit according to claim 5,
wherein the phase error detecting section is configured to stop counting of the second reference clock at a first case where the speed pulse is not input within a first period of time, and wherein the first period of time is a period of time during which counting of the second reference clock is reset two times, each occurring as the count value of the second reference clock reaching the second reference count value, after the counting of the second reference clock starts.

9. The motor control circuit according to claim 8,
wherein at the first case, the phase error detecting section stops the counting of the second reference clock and makes the torque command data to be output from the addition section into a maximum value.

10. The motor control circuit according to claim 5,
wherein the phase error detecting section stops counting of the second reference clock in a second case where, during a period of time until the speed pulse is input two times, the counting of the second reference clock is not reset even one time as the count value of the second reference clock reaching the second reference count value.

11. The motor control circuit according to claim 10,
wherein at the second case, the phase error detecting section stops counting of the second reference clock and makes the torque command data to be output from the addition section into a minimum value.

12. The motor control circuit according to claim 1,
wherein the first output section is configured such that a frequency of the first reference clock is adjustable, and wherein by adjusting the frequency of the first reference clock, a gain and a range of speed system control using the speed error detecting section are set.

13. The motor control circuit according to claim 1,
wherein the second output section is configured such that a frequency of the second reference clock is adjustable, and wherein by adjusting the frequency of the second reference clock, a gain and a range of phase system control using the phase error detecting section are set.

14. The motor control circuit according to claim 1,
wherein the motor driving section is configured to control driving of the motor in accordance with a third reference clock for a PWM control, which is independent from the first reference clock and the second reference clock.

15. The motor control circuit according to claim 1,
wherein the motor driving section includes:
a PWM signal generating circuit configured to generate the PWM command signal based on the torque command data output from the addition section; and
a motor driving circuit configured to drive the motor according to the PWM command signal generated by the PWM signal generating circuit.

* * * * *